United States Patent
Yun et al.

(10) Patent No.: US 9,167,526 B2
(45) Date of Patent: Oct. 20, 2015

(54) MOBILE TERMINAL AND CONTROLLING METHOD THEREOF

(75) Inventors: Jeong Kyun Yun, Anyang-si (KR); Baek Ju Lee, Seoul (KR)

(73) Assignee: LG Electronics Inc., Seoul (KR)

(*) Notice: Subject to any disclaimer, the term of this patent is extended or adjusted under 35 U.S.C. 154(b) by 620 days.

(21) Appl. No.: 12/973,652

(22) Filed: Dec. 20, 2010

(65) Prior Publication Data

US 2011/0158143 A1 Jun. 30, 2011

(30) Foreign Application Priority Data

Dec. 29, 2009 (KR) .................. 10-2009-0132620
Dec. 29, 2009 (KR) .................. 10-2009-0132621

(51) Int. Cl.
*G08C 17/00* (2006.01)
*H04W 52/02* (2009.01)
*H04W 88/06* (2009.01)
*H04W 88/08* (2009.01)

(52) U.S. Cl.
CPC .......... *H04W 52/0251* (2013.01); *H04W 88/06* (2013.01); *H04W 88/08* (2013.01); *Y02B 60/50* (2013.01)

(58) Field of Classification Search
CPC .................. H04W 52/02; H04W 52/0251
USPC ........... 370/311; 455/343.1, 343, 2, 4, 343.6, 455/344, 11.1, 41.2, 422
See application file for complete search history.

(56) References Cited

U.S. PATENT DOCUMENTS 7,505,795 B1* 3/2009 Lim et al. ................ 455/574
7,555,663 B2* 6/2009 Krantz et al. .............. 713/324
7,720,021 B1* 5/2010 Zhou et al. ................ 370/315
7,756,103 B2* 7/2010 Alon et al. ................ 370/349
7,924,756 B2* 4/2011 Son et al. .................. 370/311

(Continued)

FOREIGN PATENT DOCUMENTS

CN 101483829 A 7/2009
CN 101557330 A 10/2009

(Continued)

OTHER PUBLICATIONS

Sunggeun Jin, et al., A Novel Idle Mode Operation in IEEE 802.11 WLANs, 2006, Seoul National Universiy, Seoul, Korea, pp. 4824-4829.*

(Continued)

*Primary Examiner* — Anh-Vu Ly
*Assistant Examiner* — Phyllis A Book
(74) *Attorney, Agent, or Firm* — Birch, Stewart, Kolasch & Birch, LLP

(57) ABSTRACT

A mobile terminal including a user input unit configured to input information into the mobile terminal; a display unit configured to display data; a Wi-Fi module configured to provide an Access Point (AP) function such that an external terminal can access a wireless network through the Wi-Fi module providing the AP function; and a controller configured to control a state of the Wi-Fi module to be switched between 1) a power saving mode in which the Wi-Fi module is alternated between a sleep state and an awake state and 2) a power saving off mode in which the Wi-Fi module is continuously maintained in the awake state until a Wi-Fi connection request signal is received from the external device or a predetermined amount of time passes from a specific timing point.

12 Claims, 20 Drawing Sheets

(56) References Cited

U.S. PATENT DOCUMENTS

| | | | | |
|---|---|---|---|---|
| 7,965,651 | B2* | 6/2011 | Du et al. | 370/252 |
| 7,965,668 | B2* | 6/2011 | Zhang et al. | 370/311 |
| 7,965,983 | B1* | 6/2011 | Swan et al. | 455/41.2 |
| 8,078,896 | B2* | 12/2011 | Karlsson | 713/323 |
| 8,339,991 | B2* | 12/2012 | Biswas et al. | 370/254 |
| 8,358,612 | B2* | 1/2013 | Wentink | 370/328 |
| 8,385,986 | B2* | 2/2013 | Kim | 455/574 |
| 8,411,588 | B2* | 4/2013 | Wu et al. | 370/254 |
| 2005/0229226 | A1* | 10/2005 | Relan et al. | 725/114 |
| 2007/0218860 | A1* | 9/2007 | Wentink | 455/343.1 |
| 2007/0268403 | A1* | 11/2007 | Oda et al. | 348/460 |
| 2008/0002600 | A1* | 1/2008 | Choi | 370/311 |
| 2008/0095090 | A1* | 4/2008 | Lee et al. | 370/311 |
| 2008/0162953 | A1* | 7/2008 | Hsun | 713/300 |
| 2009/0034443 | A1* | 2/2009 | Walker et al. | 370/311 |
| 2009/0239574 | A1* | 9/2009 | Hussain | 455/552.1 |
| 2009/0279467 | A1* | 11/2009 | Ji | 370/311 |
| 2010/0008276 | A1* | 1/2010 | Kopikare et al. | 370/311 |
| 2010/0050005 | A1* | 2/2010 | Fujiwara | 713/320 |
| 2010/0057924 | A1* | 3/2010 | Rauber et al. | 709/229 |
| 2010/0082414 | A1* | 4/2010 | Shimaya | 705/14.4 |
| 2010/0128645 | A1* | 5/2010 | Lin et al. | 370/311 |
| 2010/0167792 | A1* | 7/2010 | Chen et al. | 455/566 |
| 2010/0302980 | A1* | 12/2010 | Ji et al. | 370/311 |
| 2011/0116427 | A1* | 5/2011 | Chang et al. | 370/311 |
| 2011/0128901 | A1* | 6/2011 | Lee et al. | 370/311 |
| 2011/0158143 | A1* | 6/2011 | Yun et al. | 370/311 |
| 2012/0315960 | A1* | 12/2012 | Kim | 455/574 |

FOREIGN PATENT DOCUMENTS

| | | |
|---|---|---|
| JP | 2008-217640 A | 9/2008 |
| JP | 2009-118160 A | 5/2009 |
| JP | 2009-206762 A | 9/2009 |
| KR | 10-2005-0023822 A | 3/2005 |
| WO | WO 2006/036999 A2 | 4/2006 |
| WO | WO 2006036999 A2 * | 4/2006 |
| WO | WO 2009/062188 A1 | 5/2009 |
| WO | WO 2009062188 A1 * | 5/2009 ............ H04W 52/02 |

OTHER PUBLICATIONS

Rong Zheng, et al., On-Demand Power Management for Ad Hoc Networks, Nov. 26, 2003, Science Direct, Ad Hoc Networks 3 (2005), pp. 51-68.*

Jin et al., "A Novel Idle Mode Operation in IEEE 802.11 WLANs", IEEE Communications Society, ICC 2006 proceedings, pp. 4824-4829, XP031025673.

Zheng et al., "On-demand power management for ad hoc networks", Ad Hoc Networks, vol. 3, Nov. 26, 2003, pp. 51-68, XP004645830.

Zheng et al. "On-demand Power Management for Ad Hoc Networks", Infocom 2003, Twenty-Second Annual Joint Conference of the IEEE Computer and Communications, IEEE Societies, vol. 1, Mar. 30-Apr. 3, 2003, pp. 481-491.

* cited by examiner

FIG. 15
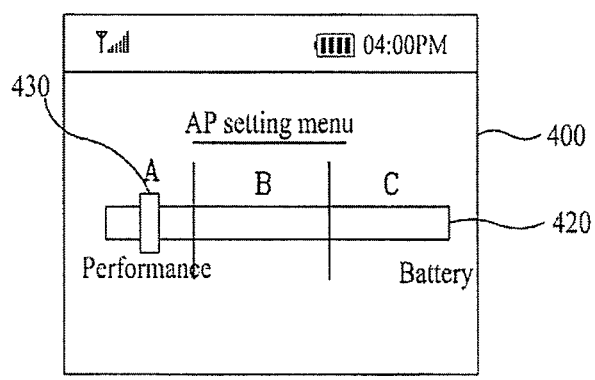
(15-1)
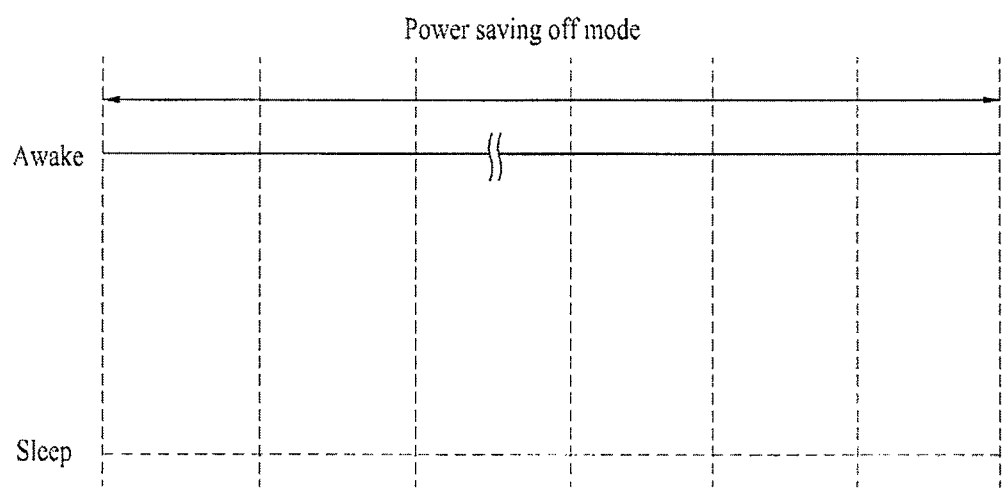
(15-2)

FIG. 16
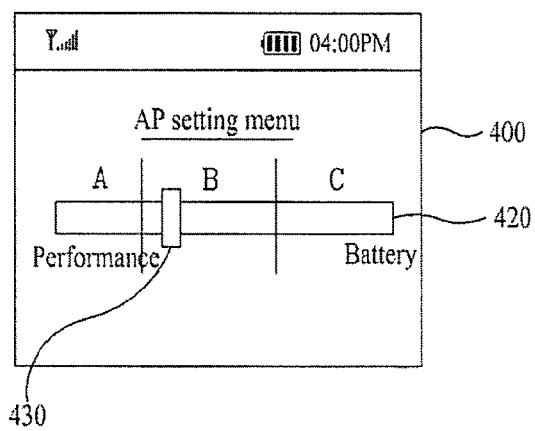
(16-1)
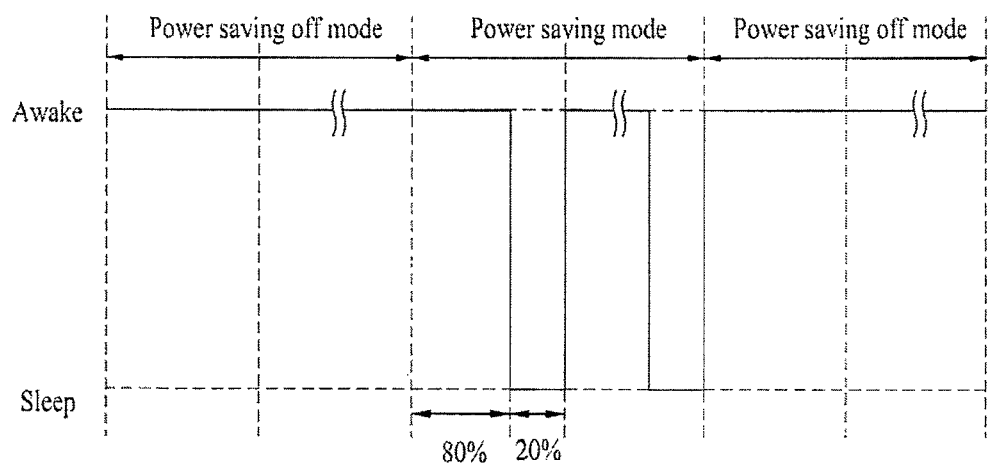
(16-2)

FIG. 17
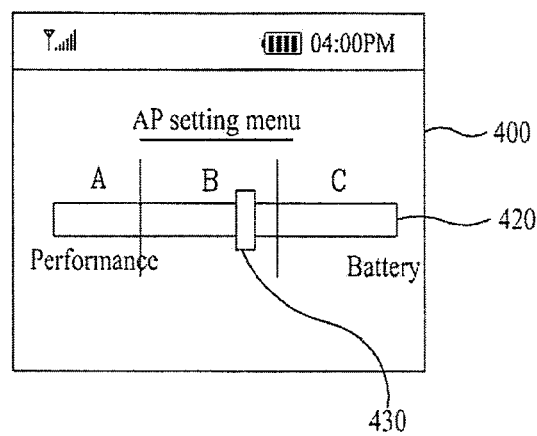
(17-1)
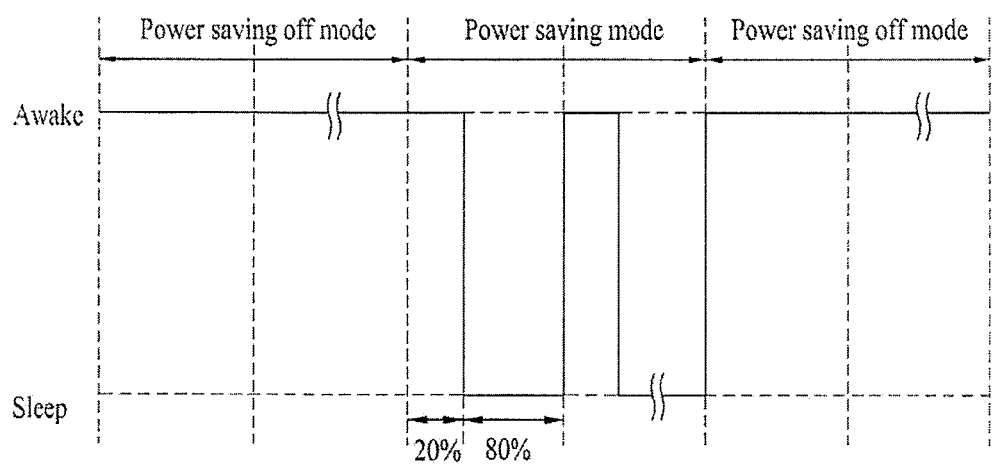
(17-2)

FIG. 18
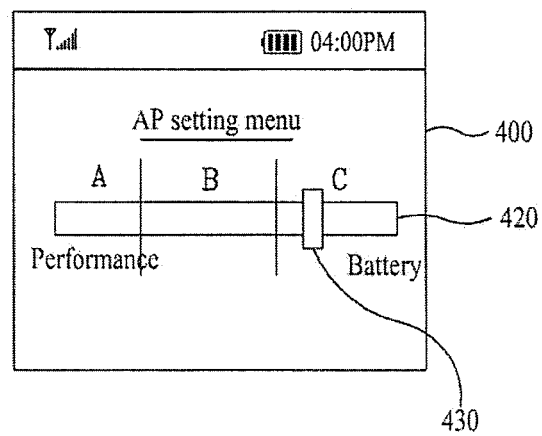
(18-1)
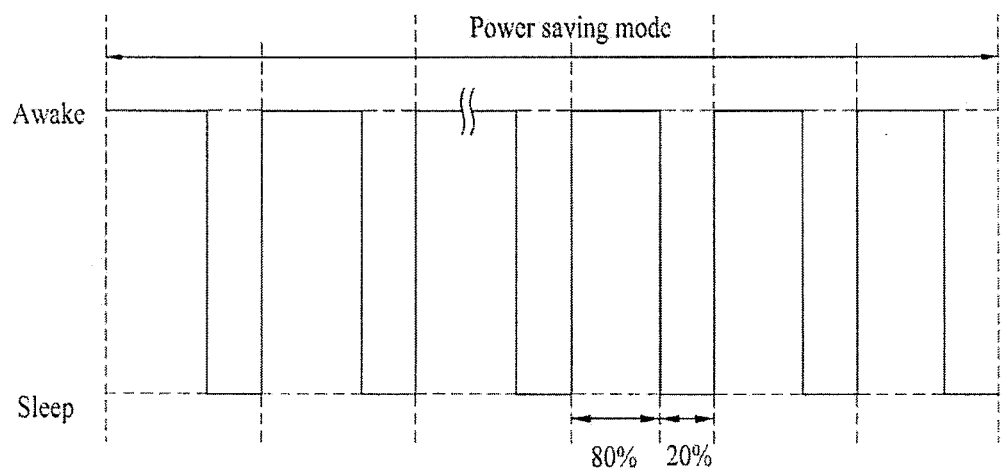
(18-2)

FIG. 19
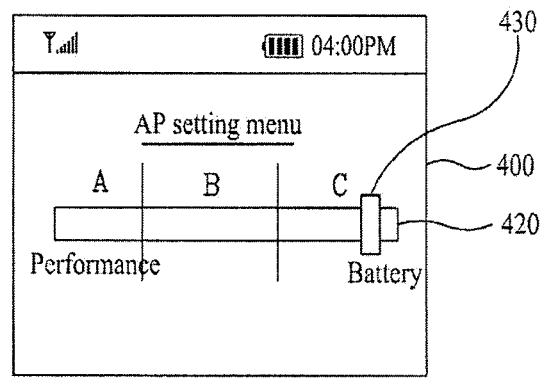
(19-1)
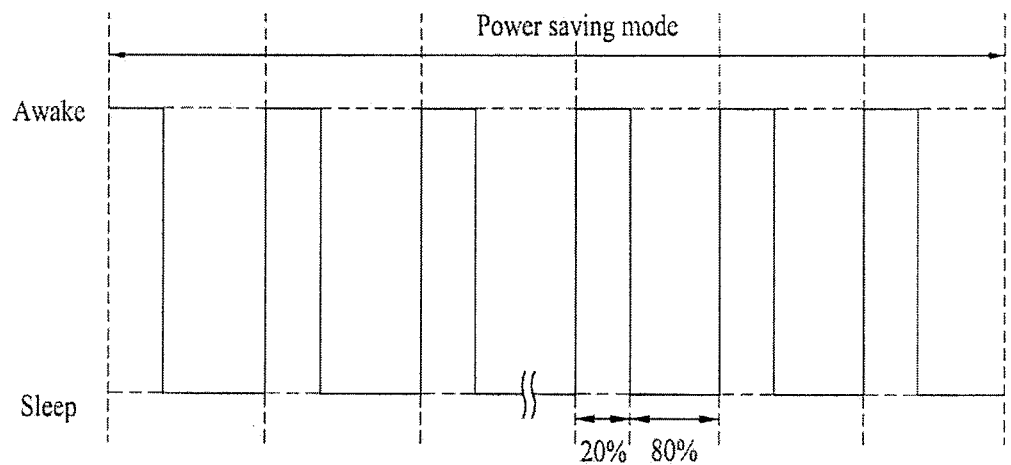
(19-2)

FIG. 20
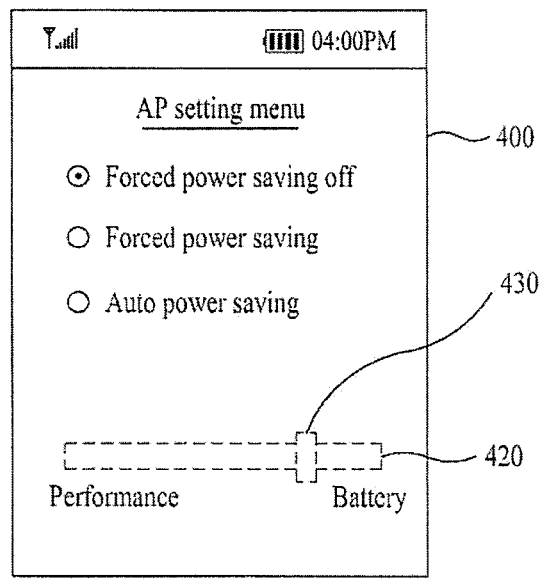
(20-1)
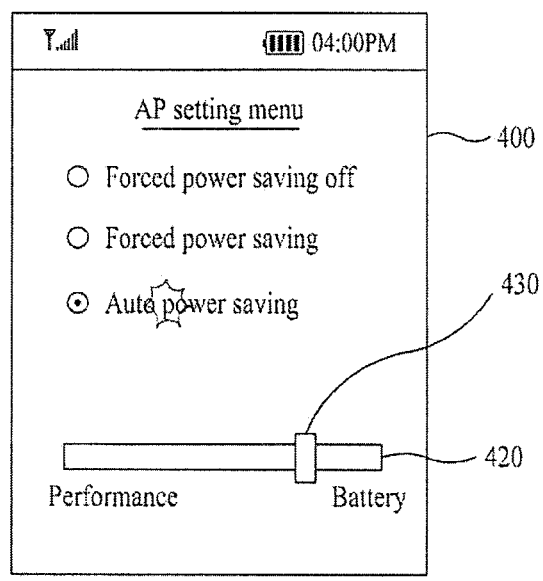
(20-2)

Pursuant to 35 U.S.C. §119(a), this application claims the benefit of earlier filing date and right of priority to Korean Application Nos. 10-2009-0132620, filed on Dec. 29, 2009 and 10-2009-0132621 filed on Dec. 29, 2009, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a mobile terminal capable of an access point (hereinafter abbreviated AP) for providing a wireless LAN service to other devices according to IEEE 802.11 Standards has been introduced. The wireless local area network (hereinafter abbreviated WLAN) means a network environment that provides a LAN service to such an external device as a notebook computer equipped with a WLAN card using an AP device corresponding to a hub of a wire LAN. In the field of the mobile communication technology, the IEEE 802.11 technology is generally called 'Wi-Fi'. In the following description, the terminologies 'WLAN' and 'Wi-Fi' mean the technologies based on IEEE 802.11.

Once the AP function is activated in the mobile terminal, such an external device as a notebook computer can perform a Wi-Fi access to the mobile terminal via the AP function.

In case of a general AP device, a power is supplied from a commercial power source (e.g., a wall electric outlet). Therefore, since a use of the general AP device is barely limited due to its power consumption, the necessity for the power saving is not considerable.

However, unlike the general AP device, since the mobile terminal normally needs a battery power to work instead of receiving a power from a commercial power source, the necessity for the power saving should be taken into consideration. Hence, many efforts are ongoing to be made to research and develop a method of reducing power consumption without interrupting the AP function activated in the mobile terminal.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof for the following. First of all, when an AP function is activated in a mobile terminal, power consumption can be reduced without interrupting the activated AP function. Therefore, the mobile terminal is able to operate as an AP for long duration on single charge of electricity.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a user input unit, a display unit, a Wi-Fi module configured to provide an AP function, and a controller controlling the AP function to be activated, the controller controlling a state of the Wi-Fi module to be switched between a sleep state and an awake state, the controller controlling the Wi-Fi module to stay in a power saving off mode for maintaining the awake state until a Wi-Fi connection request signal is received from at least one external device via the Wi-Fi module or a prescribed duration passes from a specific timing point.

In another aspect of the present invention, a method of controlling a mobile terminal according to the present invention includes activating an AP function in a Wi-Fi module capable of switching between a sleep state and an awake state and controlling the Wi-Fi module to stay in a power saving off mode for maintaining the awake state until a Wi-Fi connection request signal is received from at least one external device or a prescribed duration passes from a specific timing point.

In another aspect of the present invention, a mobile terminal includes a user input unit, a display unit, a Wi-Fi module configured to provide an AP function to enable a Wi-Fi connection to at least one external device, and a controller controlling the AP function to be activated, the controller controlling a ratio of a sleep interval of a sleep state to an awake interval of an awake state to be adjusted by a user in a power saving mode for the Wi-Fi module to be periodically switched between the sleep mode and the awake mode.

In another aspect of the present invention, 28. A mobile terminal includes a user input unit, a display unit, a Wi-Fi module configured to provide an AP function to enable a Wi-Fi connection to at least one external device, and a controller controlling the AP function to be activated, the controller controlling one setting in a group including an auto power saving setting and a forced power saving setting to be applied to the Wi-Fi module according to a user selection.

In another aspect of the present invention, a method of controlling a mobile terminal according to the present invention includes activating an AP function in a Wi-Fi module, and adjusting a ratio of a sleep interval of a sleep state to an awake interval of an awake state by a user selection in a power saving mode for the Wi-Fi module to be periodically switched between the sleep mode and the awake mode.

In a further aspect of the present invention, a method of controlling a mobile terminal according to the present invention includes activating an AP function in a Wi-Fi module configured to be switchable between a sleep state and an awake state and applying one setting in a group including an auto power saving setting and a forced power saving setting to the Wi-Fi module according to a user selection.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 15 to 19 are diagrams of display screen configurations for implementing the mobile terminal controlling method according to the embodiment of the present invention shown in FIG. 14 and graphs for indicating an awake/sleep state of the Wi-Fi module in the mobile terminal controlling method according to the embodiment of the present invention shown in FIG. 14; and FIG. 20 is a diagram of a display screen configuration for implementing the mobile terminal controlling method according to the embodiment of the present invention shown in FIG. 14.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
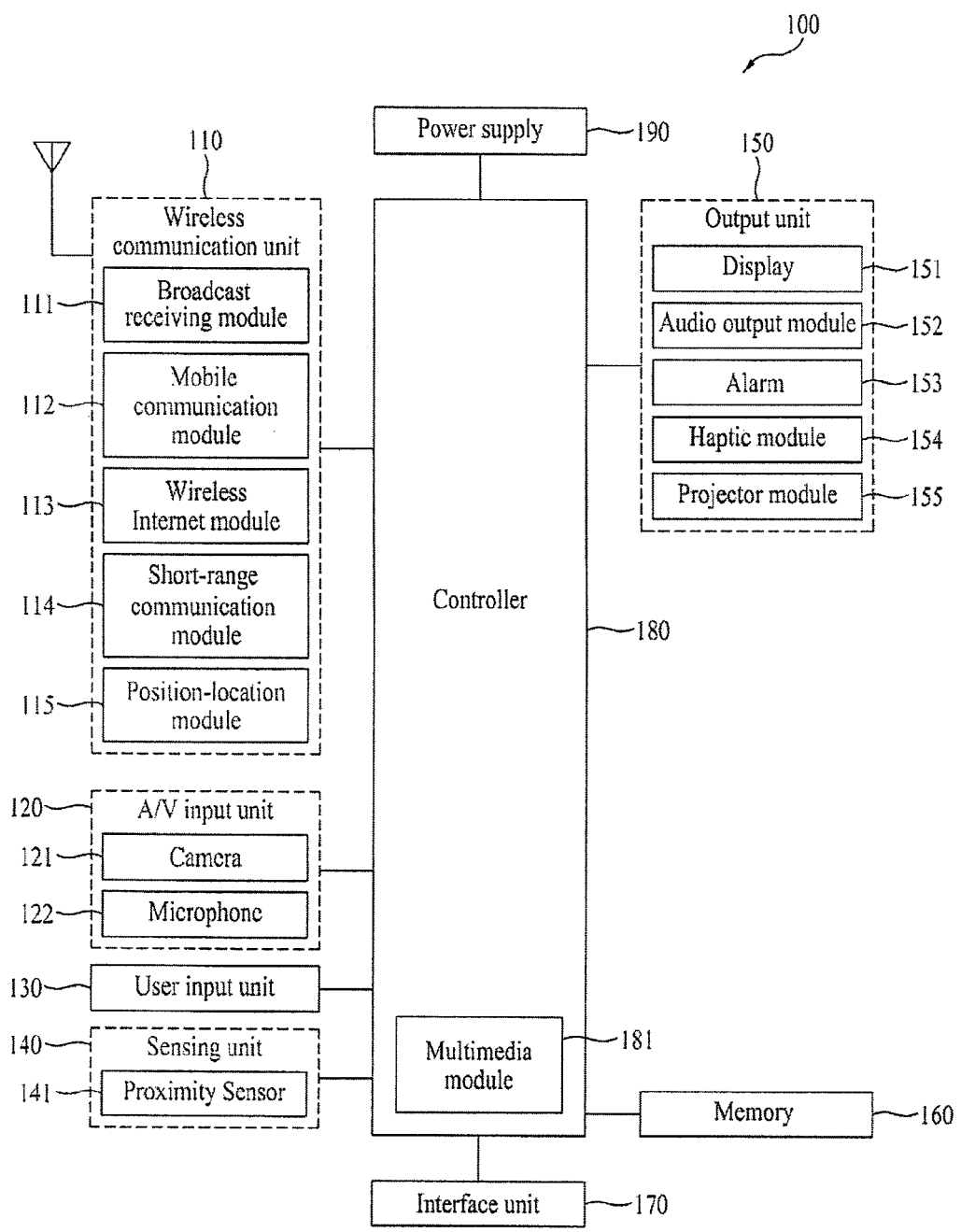
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By a non-limiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Gobal System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

In the following description, the wireless internet module shall be named 'Wi-Fi module'. In this case, the Wi-Fi module is able to provide an AP function enabling such an external device as a notebook computer to perform a Wi-Fi access, which shall be described later.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few.

In case that the AP function is activated for the Wi-Fi access to an external device, the Wi-Fi module 113 is able to work as the short-range communication module 114.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

And, the controller 180 is able to control the Wi-Fi module 113 to perform the AP function.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
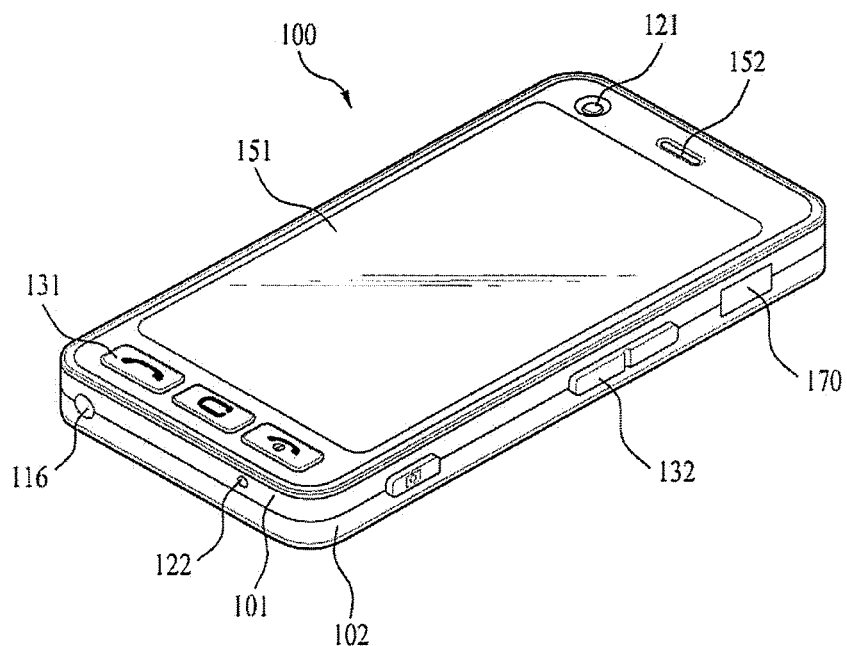
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
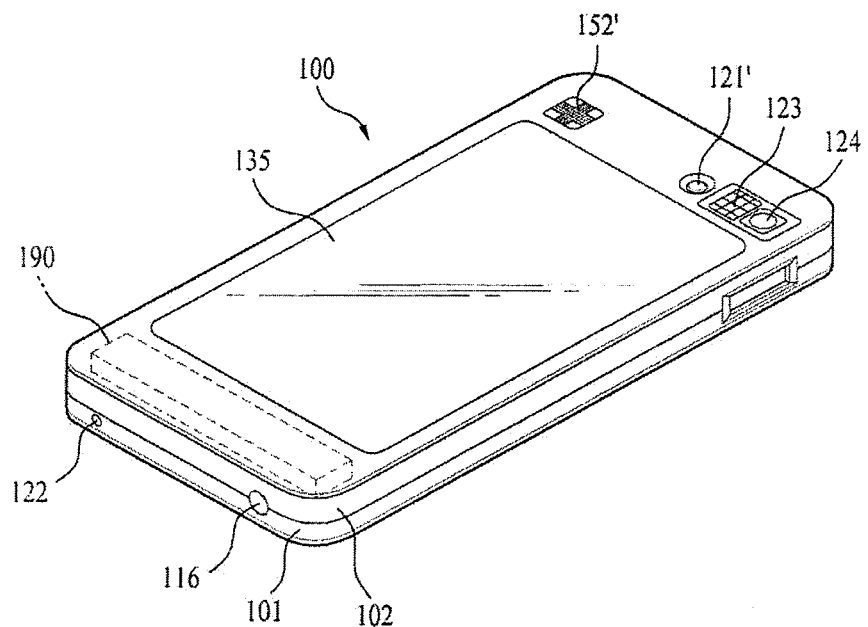
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, embodiments related to a controlling method, which can be implemented in the mobile terminal 100, are explained with reference to the accompanying drawings. And, it is a matter of course that the following embodiments are available independently or in a manner of being combined together.

In the following description, a wireless environment, in which a mobile terminal and controlling method thereof according to an embodiment of the present invention can be implemented, is schematically explained with reference to FIG. 3.

Figure 3:
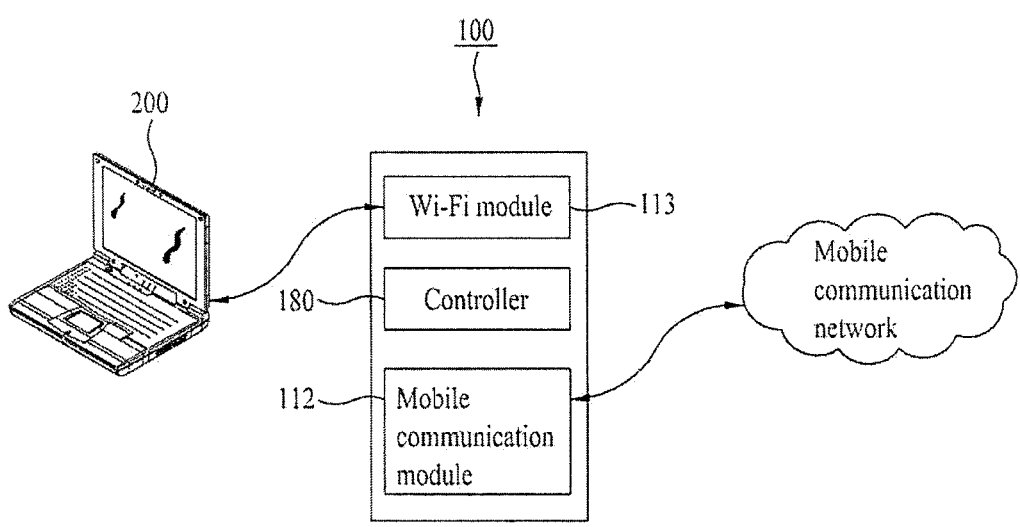
FIG. 3 is a schematic diagram of a wireless environment for implementing a mobile terminal and controlling method thereof according to an embodiment of the present invention.

FIG. 3 is a schematic diagram of a wireless environment for implementing a mobile terminal and controlling method thereof according to an embodiment of the present invention.

Referring to FIG. 3, in case that the Wi-Fi module 113 of the mobile terminal 100 performs the AP function, such an external device 200 as a notebook computer is able to perform a Wi-Fi access to the Wi-Fi module 113.

And, the mobile communication module 112 of the mobile terminal 100 is able to perform an internet access to a mobile communication network.

Therefore, in case that the external device 200 is unable to perform the internet access directly to the mobile communication network, the external device 200 is able to perform the mobile communication access indirectly to the mobile communication network via the mobile terminal 100.

In the following description, a process for the external device to access an AP is explained with reference to FIG. 4.

Figure 4:
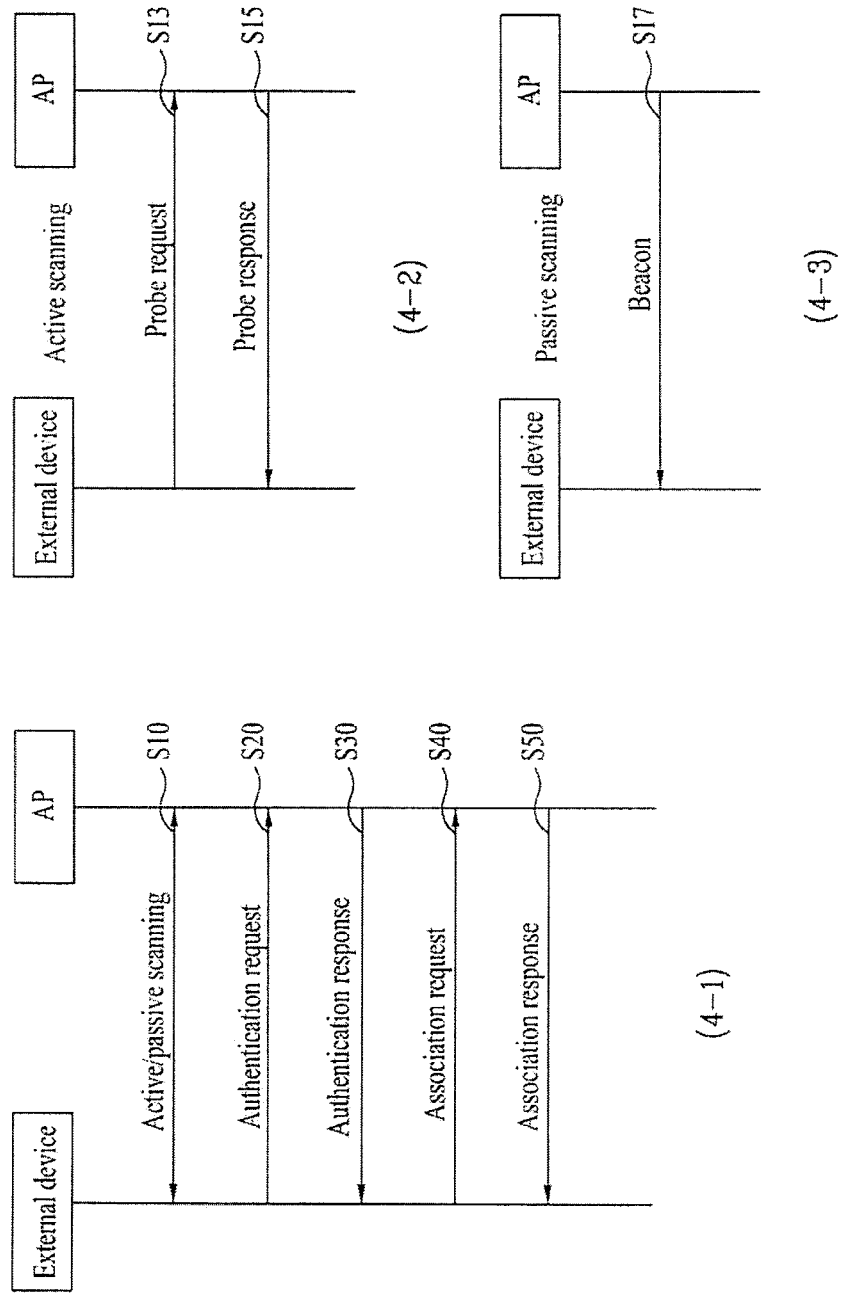
FIG. 4 is a flowchart of a process for an external device to access an AP.

FIG. 4 is a flowchart of a process for an external device to access an AP.

Referring to FIG. 4 (4-1), the external device scans neighbor APs using a probe message or a beacon (AP scanning) [S10]. In this case, the AP scanning can be classified into an active scanning and a passive scanning.

Regarding the active scanning, as shown in FIG. 4 (4-2), the external device scans AP in a manner of sending a probe request message [S13] and then receiving a probe response message from an available AP [S15].

Regarding the passive scanning, as shown in FIG. 4 (4-3), the external device scans AP in a manner of receiving a beacon periodically broadcasted by the AP [S17].

If the AP scanning is completed, the external device performs an authentication procedure in a manner of sending an authentication request message to the AP and then receiving an authentication response message in response to the authentication request message [S20, S30]. Since an open system authentication scheme is frequently used, the AP performs authentication for the authentication request from the external device unconditionally. As a reinforced authentication method, there is 802.1x-based EAP-TLS, EAP-TTLS, EAP-FAST, PEAP or the like.

Once the authentication procedure is completed, the external device performs an association procedure in a manner of sending an association request message to the AP and then receiving an association response message from the AP in response to the association request message [S40, S50]. In this case, the association procedure is a procedure for the external device to join a wireless network provided by the AP by accessing the AP. In particular, if the association procedure is completed, the external device achieves the Wi-Fi access to the AP.

Every message, which is sent to the AP by the external device to access the AP, can be named a Wi-Fi connection request signal in general. In the Wi-Fi access process after the active or passive scanning, an initial reception signal initially received by the AP among the Wi-Fi connection request signals is the authentication request message. In the Wi-Fi access process according to the passive scanning, an initial reception signal initially received by the AP among the Wi-Fi connection request signals is a message (i.e., a beacon ACK message not shown in FIG. 4) sent by the external device in response to the beacon. The meaning or importance of the initial reception signal in the present invention shall be described later in this disclosure.

The Wi-Fi module performing the AP function can switch its state between an awake state and a sleep state to reduce its power consumption if necessary. This is explained with reference to FIG. 5 as follows.

Figure 5:
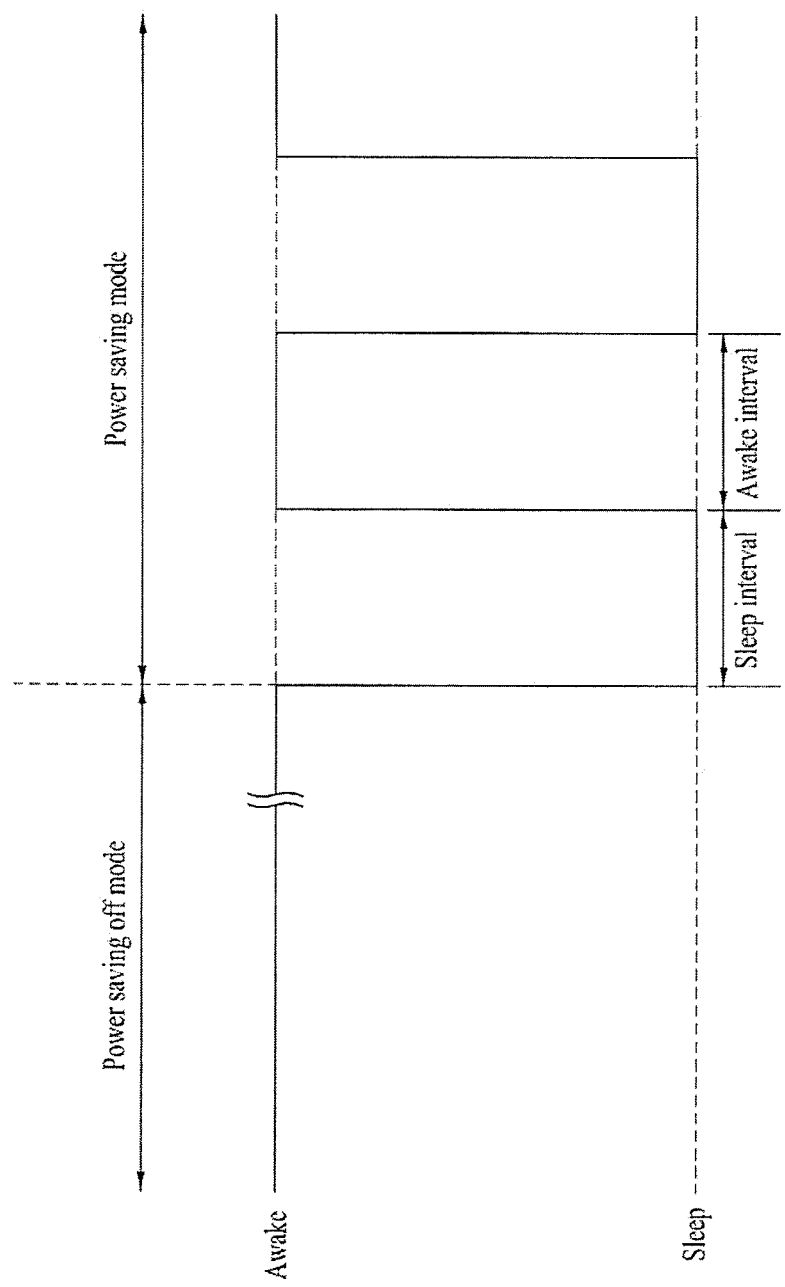
FIG. 5 is a graph of a switching between an awake state and a sleep state in a Wi-Fi module of a mobile terminal according to the present invention.

FIG. 5 is a graph of a switching between an awake state and a sleep state in a Wi-Fi module of a mobile terminal according to the present invention.

Referring to FIG. 5, the awake state means a state that the Wi-Fi module is normally operating after the activation of the AP function. And, the sleep state means a state that the Wi-Fi module temporarily stops the operation of the AP function despite the activated AP function.

A mode for enabling the Wi-Fi module to stay in the awake state is called a power save off mode. And, a mode for enabling the Wi-Fi module to repeat the awake state and the sleep state periodically (or non-periodically) is called a power saving mode.

In case that the Wi-Fi module is in the power saving off mode, it keeps staying in the awake state to provide good Wi-Fi performance. Yet, as a corresponding power consumption increases, it causes a poor result in aspect of battery power saving.

If the Wi-Fi module is in the power saving mode, as the awake state and the sleep state are repeated. Comparing the power saving mode to the power saving off mode, it results in a poor Wi-Fi performance. Yet, since a corresponding power consumption is reduced, it brings a good result in aspect of battery power saving.

Even if the Wi-Fi module is in the power saving mode, The Wi-Fi performance and the battery power saving are affected by a ratio of an interval (i.e., an awake interval) of the awake state to an interval (i.e., a sleep interval) of the sleep state. If the awake interval increases and the sleep interval decreases, the Wi-Fi performance gets better while the battery power saving gets worse. On the contrary, if the awake interval decreases and the sleep interval increases, the Wi-Fi performance gets worse while the battery power saving gets better.

In the following description, a controlling method, which can be implemented in the mobile terminal, according to an embodiment is explained with reference to FIGS. 6 to 9.

Figure 6:
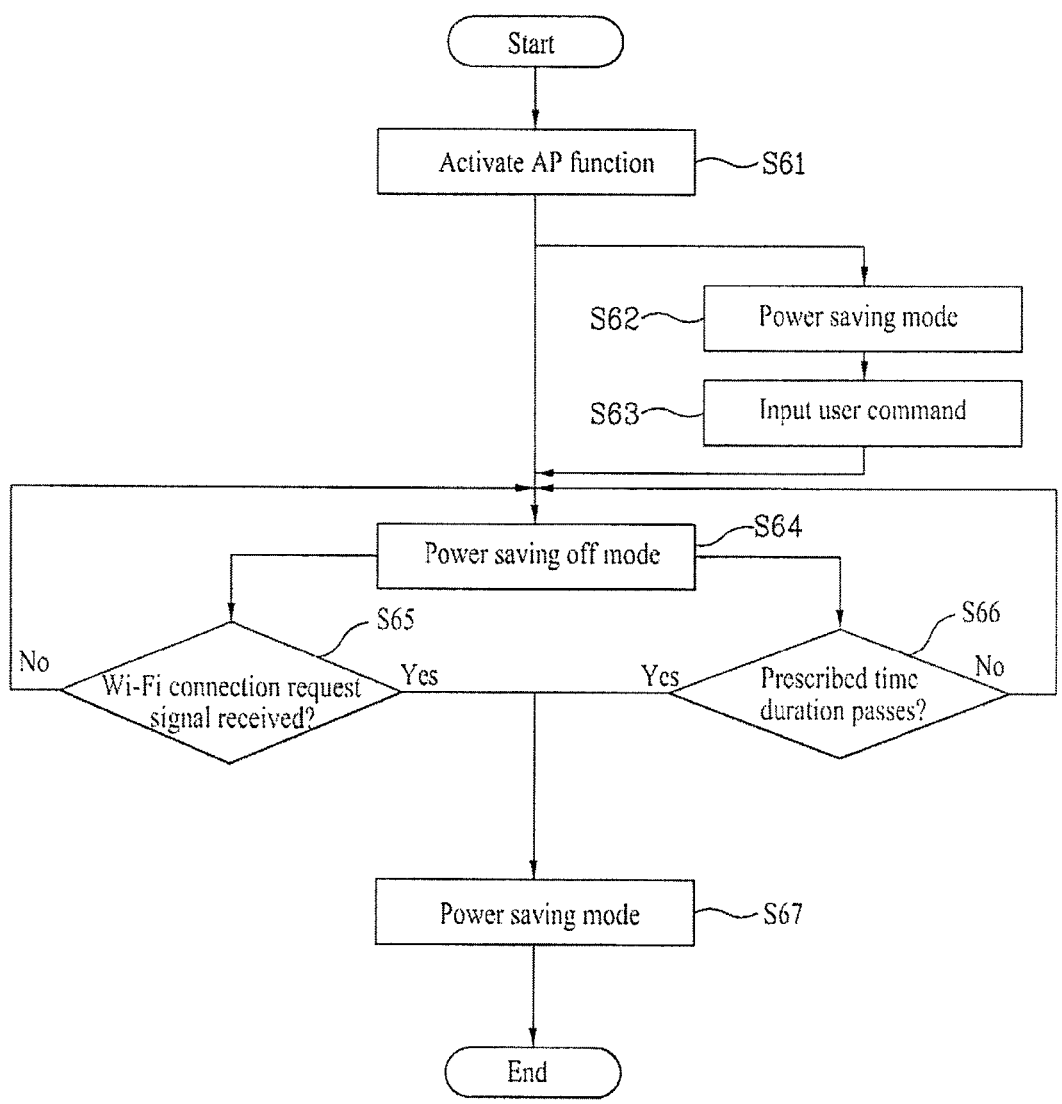
FIG. 6 is a flowchart for a method of controlling a mobile terminal according to an embodiment of the present invention.
Figure 7:
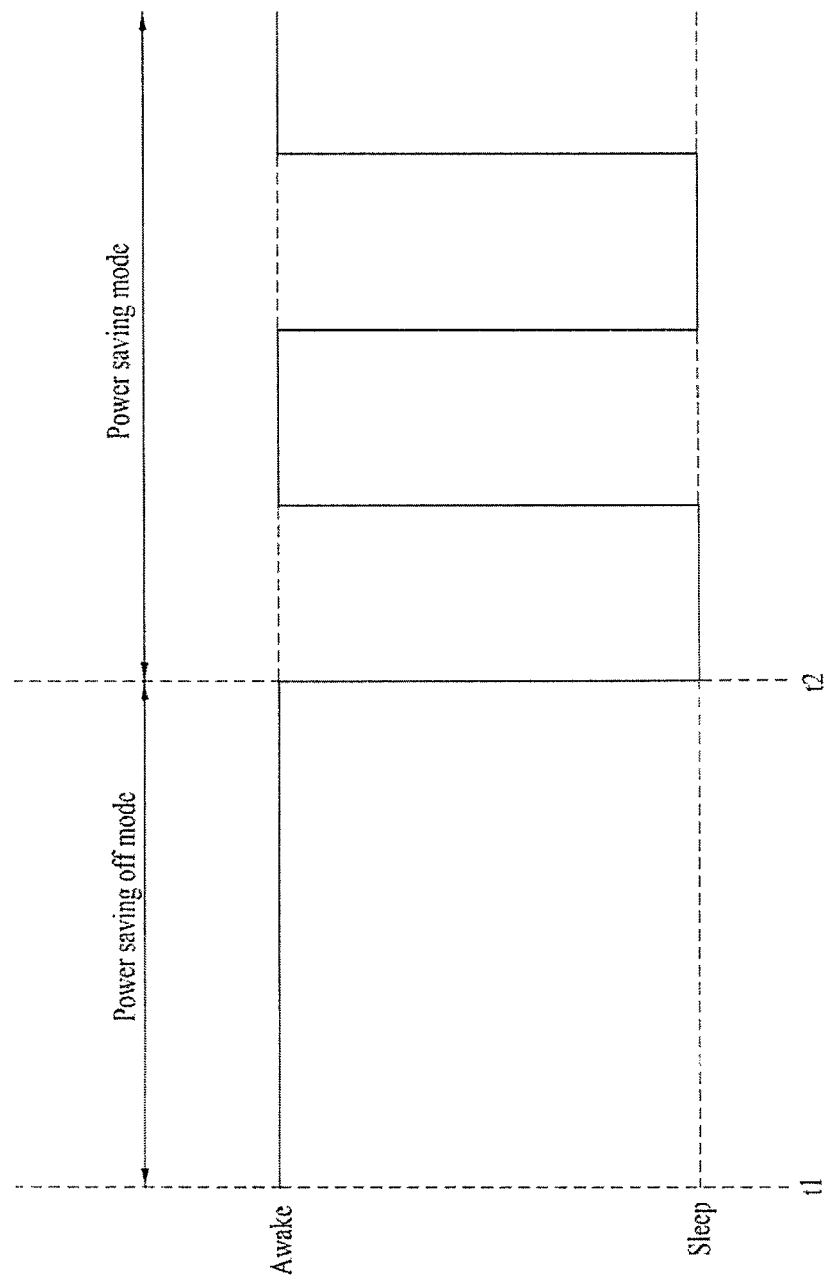
FIG. 7 and FIG. 8 are graphs for indicating an awake/sleep state of the Wi-Fi module in the mobile terminal controlling method according to the embodiment of the present invention shown in FIG. 6.
Figure 8:
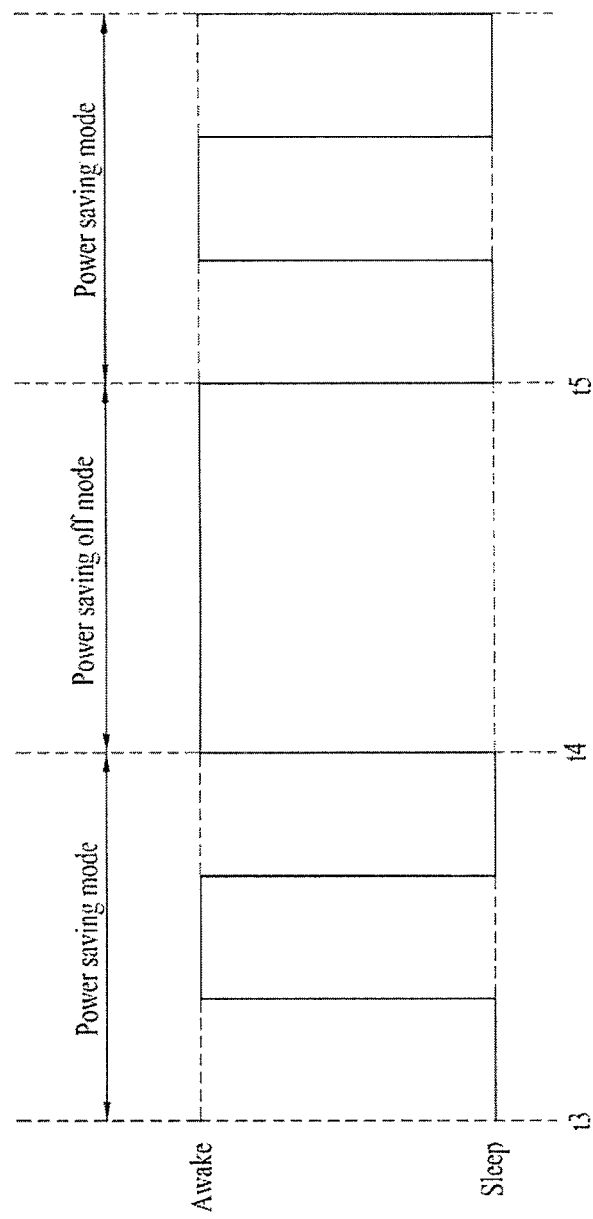
Figure 9:
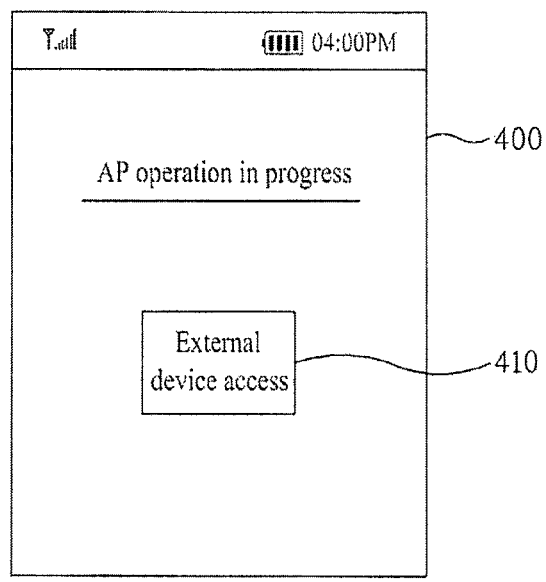
FIG. 9 is a diagram of a display screen configuration for implementing the mobile terminal controlling method according to the embodiment of the present invention shown in FIG. 6.

FIG. 6 is a flowchart for a method of controlling a mobile terminal according to an embodiment of the present invention, FIG. 7 and FIG. 8 are graphs for indicating an awake/sleep state of the Wi-Fi module in the mobile terminal controlling method according to the embodiment of the present invention shown in FIG. 6, and FIG. 9 is a diagram of a display screen configuration for implementing the mobile terminal controlling method according to the embodiment of the present invention shown in FIG. 6.

Referring to FIG. 6, an AP function of the Wi-Fi module 113 of the mobile terminal 100 is activated [S61].

Once the AP function is activated ($t_1$), the Wi-Fi module 113 is able to directly enter the power saving off mode [S64]. That is, the Wi-Fi module 113 keeps staying in the wake state for a while.

On the contrary, when the AP function is activated, the Wi-Fi module 113 may be in the power saving mode. If a prescribed user command is inputted via the user input unit 130, the Wi-Fi module 113 is able to enter the power saving off mode [S62, S63]. This shall be described with reference to FIG. 8 and FIG. 9 later.

While the Wi-Fi module 113 stays in the power saving off mode, the controller 180 determines whether the Wi-Fi module 113 receives a Wi-Fi connection request signal from at least one external device 200 [S65].

Alternatively, while the Wi-Fi module 113 stays in the power saving off mode, the controller 180 determines whether a prescribed duration has passed from the entry into the power saving off mode [S66]. In this case, the prescribed duration can be set by a terminal user in advance.

After the Wi-Fi module 113 has received the Wi-Fi connection request signal from one 200 of the at least one or more external devices ($t_2$), the controller 180 is able to control the Wi-Fi module 113 to enter the power saving mode [S67]. In this case, the Wi-Fi connection request signal may be the initial reception signal that is initially received by the Wi-Fi module 113 performing the AP function.

That is, the controller 180 controls the Wi-Fi module 113 to stay in the power saving off mode at least until receiving the initial reception signal among the Wi-Fi connection request signals from the one external device 200.

If the Wi-Fi module 113 receives the Wi-Fi connection request signal from the corresponding external device 200, the Wi-Fi module 113 is able to enter the power saving mode irrespective of whether the prescribed duration has passed.

Alternatively, after the Wi-Fi module 113 has entered the power saving off mode, if a prescribed duration passes ($t_2$), the controller 180 is able to control the Wi-Fi module 113 to enter the power saving mode [S67].

That is, the controller 180 controls the Wi-Fi module 113 to stay in the power saving off mode until the prescribed duration passes.

If the prescribed duration passes, the Wi-Fi module 113 is able to enter the power saving mode irrespective a presence or non-presence of a reception of the Wi-Fi connection request signal from the external device 200.

As mentioned in the foregoing description, if the AP function is activated, the Wi-Fi module 113 keeps staying in the power saving off mode Wi-Fi module 113 to maintain the awake state. Therefore, the Wi-Fi connection between the external device 200 and the Wi-Fi module 113 can be smoothly performed.

In the above description so far, the Wi-Fi module 113 keeps the power saving off mode until receiving a Wi-Fi connection request signal from one external device, by which the present invention is non-limited. Alternatively, it is able to configure the Wi-Fi module 113 to maintain the power saving off mode until receiving Wi-Fi connection request signals from a preset number of external devices.

Meanwhile, it may be necessary for the Wi-Fi module 113 to be connected to another external device while staying in the power saving mode in which the Wi-Fi module is connected via Wi-Fi to the former external device ($t_3$) [S62]. Alternatively, as mentioned in the foregoing description, when the PA function is activated, the Wi-Fi module 113 can stay not in the power saving off mode but in the power saving mode ($t_3$) [S63].

In this case, a terminal user is able to input a prescribed user input via the user input unit 130. No limitation is put on a method of inputting the user command. For instance, referring to FIG. 9, it is able to input the user command in a manner of touching 'external device access' icon 410 on the touchscreen 400.

Once the user command is inputted ($t_4$), the Wi-Fi module 113 enters the power saving off mode. In particular, the Wi-Fi module 113 keeps saying in the awake state for a while.

When the Wi-Fi module 113 stays in the power saving off mode, the controller 180 determines whether the Wi-Fi module 113 receives a Wi-Fi connection request signal from at least one external device 200 [S65].

Alternatively, when the Wi-Fi module 113 stays in the power saving off mode, the controller 180 determines whether a prescribed duration has passed from the entry into the power saving off mode [S66].

After the Wi-Fi module 113 has receives the Wi-Fi connection request signal from the one external device 200 ($t_5$) or if the prescribed duration passes from the entry into the power saving off mode ($t_5$), the controller 180 is able to control the Wi-Fi module 113 to again enter the power saving mode [S67]. The steps S65 and S67 are explained in the foregoing description and its details shall be omitted from the following description for clarity.

In the above description so far, if the Wi-Fi module needs to be connected by Wi-Fi to the external device, the corresponding connection can be smoothly performed in a manner of maintaining the power saving off mode for a while. Although now shown in the drawings, an alarm can be displayed on the display unit to indicate a switching between the power saving off mode and the power saving mode.

When the Wi-Fi module is in the power saving mode, a ratio of the awake interval to the sleep interval is adjustable. This is described in detail with reference to FIGS. 10 to 13 as follows.

Figure 10:
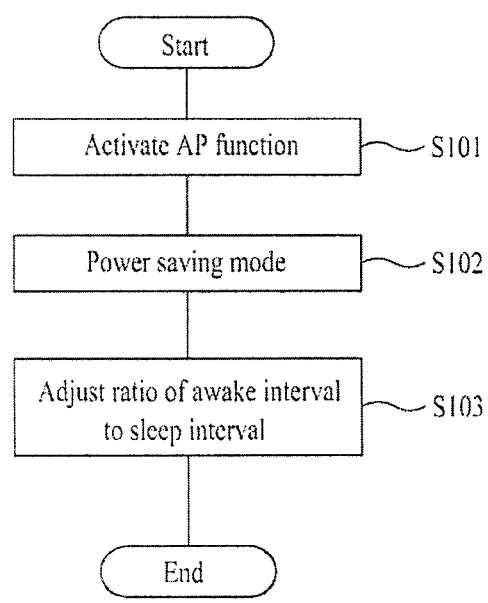
FIG. 10 is a flowchart for a method of controlling a mobile terminal according to an embodiment of the present invention.
Figure 11:
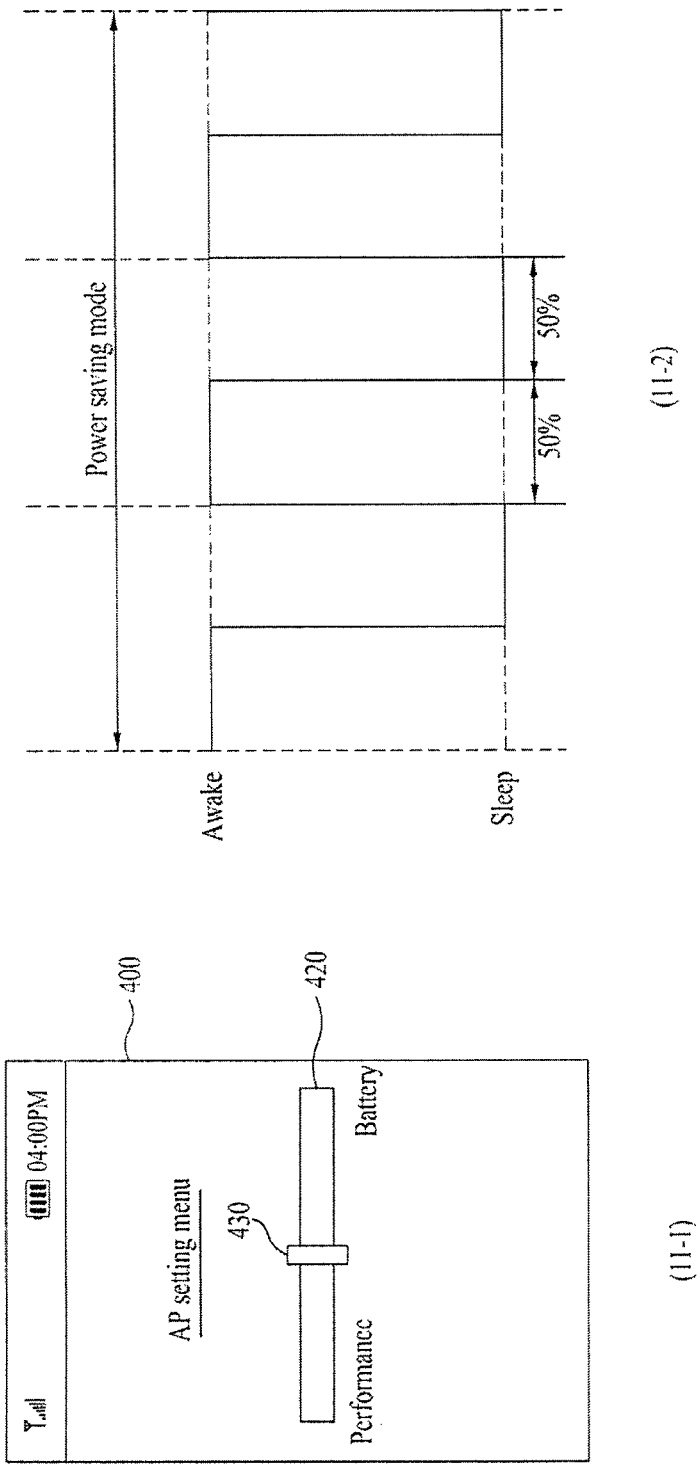
FIGS. 11 to 13 are diagrams of display screen configurations for implementing the mobile terminal controlling method according to the embodiment of the present invention shown in FIG. 10 and graphs for indicating an awake/sleep state of the Wi-Fi module in the mobile terminal controlling method according to the embodiment of the present invention shown in FIG. 10.
Figure 12:
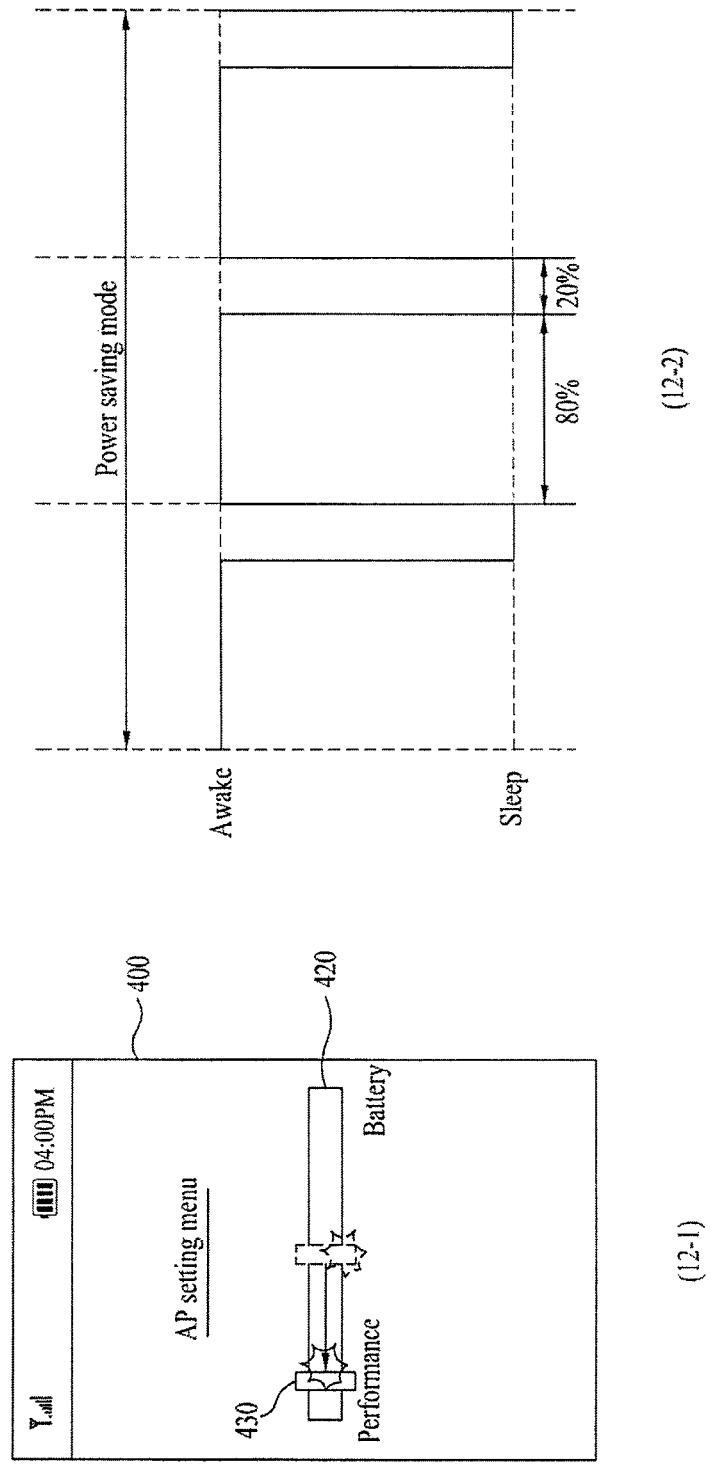
Figure 13:
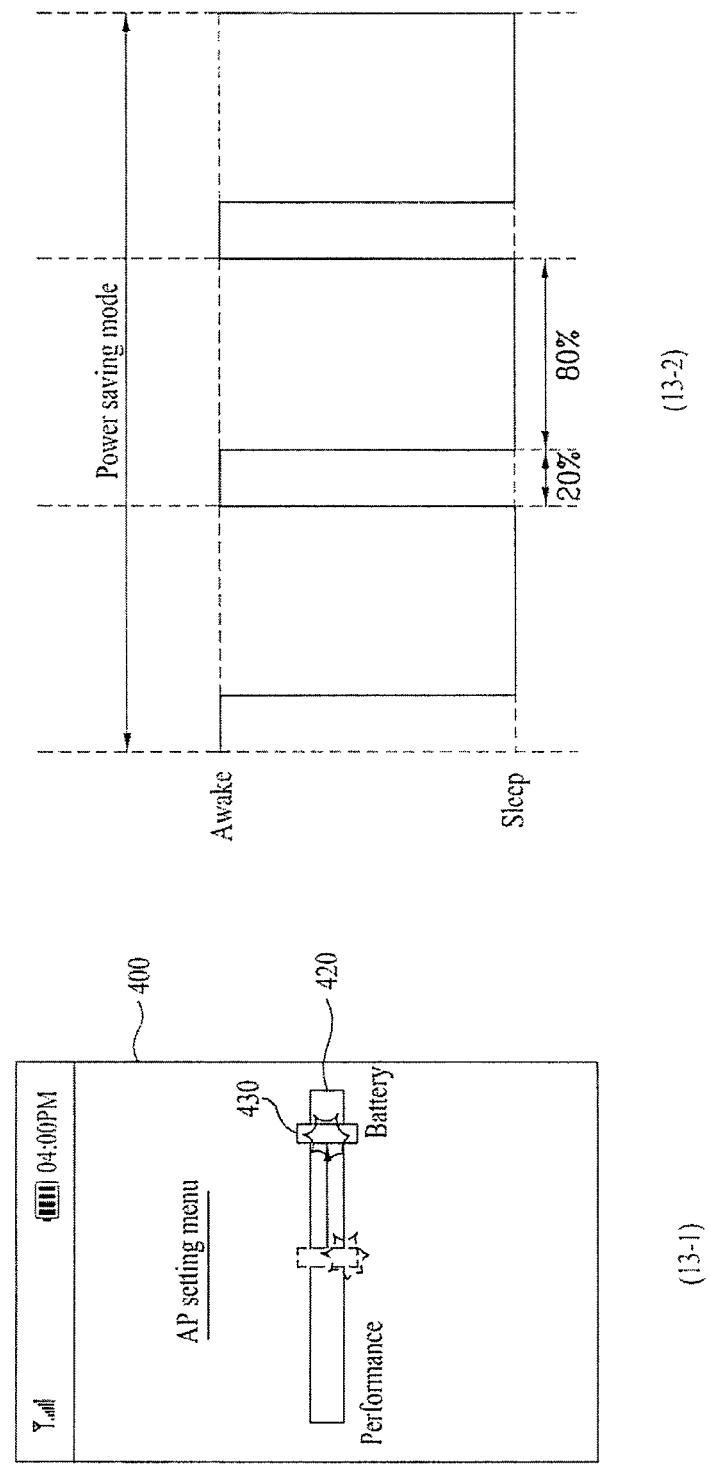

FIG. 10 is a flowchart for a method of controlling a mobile terminal according to an embodiment of the present invention, and FIGS. 11 to 13 are diagrams of display screen configurations for implementing the mobile terminal controlling method according to the embodiment of the present invention shown in FIG. 10 and graphs for indicating an awake/sleep state of the Wi-Fi module in the mobile terminal controlling method according to the embodiment of the present invention shown in FIG. 10.

Referring to FIGS. 10 to 13, as mentioned in the foregoing description, if the AP function is activated, the Wi-Fi module 113 can stay in the power saving mode before or after the Wi-Fi connection with the external device [S101, S102].

Referring to FIG. 11 (11-1), if the mobile terminal 100 enters an AP setting menu, a slide bar 430 can be displayed on a slide region 420 of the touchscreen 400. It is apparent to those skilled in the art that the AP setting menu can be entered through a proper manipulation on the user input unit 130 in the mobile terminal 100. For clarity and convenience, corresponding details are omitted from the following description.

The slide bar 430 is provided to adjust an extent of Wi-Fi performance and an extent of a battery power saving [S103].

When the slide bar 430 is located at a middle position of the slide region 420, assume the ratio of the awake interval to the sleep interval shown in FIG. 11 (11-1). Referring to FIG. 11 (11-2), the ratio of the awake interval to the sleep interval is set to 50:50, which is just exemplary for the description of the present embodiment. And, it is understood that other ratios are available as well.

Referring to FIG. 12 (12-1), if the slide bar 430 is touched & dragged in one direction, the corresponding selection can be set in a manner that the Wi-Fi performance is preferred to the battery saving.

If so, referring to FIG. 12 (12-2), the ratio of the awake interval to the sleep interval is adjusted to have the Wi-Fi performance preferred to the battery saving. In particular, in proportion to the length of the touch & drag in one direction, the sleep interval is shortened, whereas the awake interval is elongated. FIG. 12 (12-2) exemplarily shows that the ratio of the awake interval to the sleep interval is set to 80:20.

Referring to FIG. 13 (13-1), if the slide bar 430 is touched & dragged in the other direction, the corresponding selection can be set in a manner that the battery saving is preferred to the Wi-Fi performance.

If so, referring to FIG. 13 (13-2), the ratio of the awake interval to the sleep interval is adjusted to have the battery saving preferred to the Wi-Fi performance. In particular, in proportion to the length of the touch & drag in the other direction, the sleep interval is elongated, whereas the awake interval is shortened. FIG. 13 (13-2) exemplarily shows that the ratio of the awake interval to the sleep interval is set to 20:80.

In the above description, after the AP function has been activated, if the Wi-Fi module is in the power saving mode, the ratio of the awake interval to the sleep interval is adjusted, by which the present embodiment is non-limited. Alternatively, it is able to configure the ratio of the awake interval to the sleep interval to be adjusted before the Wi-Fi module enters the power saving mode after activation of the AP function. Alternatively, after the ratio of the awake interval to the sleep interval has been adjusted, the AP function is activated so that the Wi-Fi connection between the Wi-Fi module and the external device can be performed according to the adjusted ratio.

In the above description, the ratio of the awake interval to the sleep interval is manually adjusted by a terminal user, by which the present embodiment is non-limited. Alternatively, the ratio of the awake interval to the sleep interval can be automatically adjusted. For instance, after the controller 180 monitors data traffic of the Wi-Fi communication between the external device 200 and the Wi-Fi module 113, if the data traffic is considerable, the controller 180 automatically adjusts the awake interval to be longer than the sleep interval in proportion to the data traffic. If the data traffic is not considerable, the controller 180 automatically adjusts the sleep interval to be longer than the awake interval in proportion to the data traffic.

In the above description, the ratio of the awake interval to the sleep interval is adjustable in the power saving off mode.

In the following description, regarding operations of the AP function of the Wi-Fi module, there can exist various settings. And, one of the various settings is selected. This is described as follows.

Figure 14:
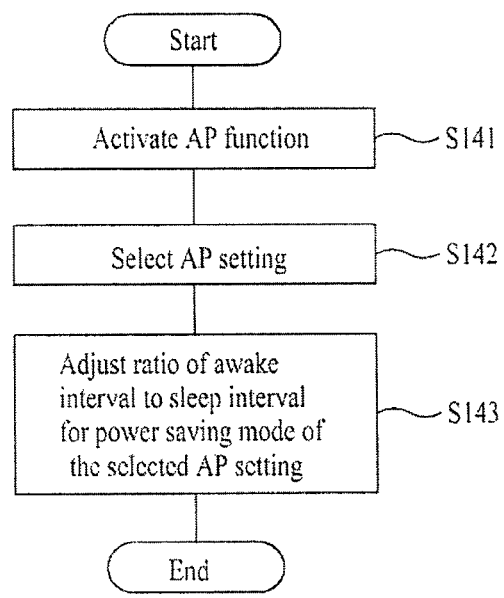
FIG. 14 is a flowchart for a method of controlling a mobile terminal according to an embodiment of the present invention.

FIG. 14 is a flowchart for a method of controlling a mobile terminal according to an embodiment of the present invention. FIGS. 15 to 19 are diagrams of display screen configurations for implementing the mobile terminal controlling method according to the embodiment of the present invention shown in FIG. 14 and graphs for indicating an awake/sleep state of the Wi-Fi module in the mobile terminal controlling method according to the embodiment of the present invention shown in FIG. 14. And, FIG. 20 is a diagram of a display screen configuration for implementing the mobile terminal controlling method according to the embodiment of the present invention shown in FIG. 14.

First of all, various settings, which can exist in association with operations of the AP function of the Wi-Fi module, are described with reference to Table 1 as follows.

TABLE 1

| Type | Description |
| --- | --- |
| Auto power saving setting | Mode switchable between a power saving off mode and a power saving mode according to data traffic. Operable in the power saving off mode if the data traffic is considerable. Operable in the power saving mode if the data traffic is not considerable. |
| Forced power saving setting | Operable in a power saving mode only |
| Forced power saving off setting | Operable in a power saving off mode only |

After the AP function has been activated [S141], one setting can be selected from the various settings [S142].

If the selected setting is the setting operable in the power saving mode, the ratio of the awake interval to the sleep interval can be adjusted for the power saving mode [S143].

The selection of one setting from the various settings and the adjustment of the ratio of the awake interval to the sleep interval are explained in detail with reference to FIGS. 15 to 19 as follows.

Referring to FIG. 15 (15-1), if the mobile terminal 100 enters an AP setting menu, a slide bar 430 can be displayed on a slide region 420 of the touchscreen 400. It is apparent to those skilled in the art that the AP setting menu can be entered through a proper manipulation on the user input unit 130 in the mobile terminal 100. For clarity and convenience, corresponding details are omitted from the following description.

In this case, the slide bar 430 is provided to select one of the settings and adjust an extent of the Wi-Fi performance and an extent of the battery power saving.

The slide region 420 includes sub-regions of sections A, B and C corresponding to the various settings, respectively. In the following description, assume that sections A, B and C correspond to the forced power saving off setting, the auto power saving setting and the forced power saving setting, respectively.

Referring to FIG. 15 (15-1), the slide bar 430 is touched & dragged to be located in the section A.

If so, referring to FIG. 15 (15-2), the AP function is set to the forced power saving off setting so that the Wi-Fi module 113 can keep operating in the power saving off mode.

Referring to FIG. 16 (16-1), the slide bar 430 is touched & dragged to be located in the section B.

If so, referring to FIG. 16 (16-2), the AP function is set to the auto power saving setting so that the Wi-Fi module 113 can operate in either the power saving off mode or the power saving mode selectively. In particular, the controller 180 monitors data traffic between the Wi-Fi module 113 and the external device 200. If the data traffic is equal to or greater than a predetermined reference (or if the data traffic exists), the controller 180 controls the AP function to operate in the power saving off mode. If the data traffic is smaller than the predetermined reference (or if the data traffic does not exist), the controller 180 controls the AP function to operate in the power saving mode.

As the slide bar 430 is touched & dragged within a range of the section B while the AP function operates in the power saving mode. In doing so, the ratio of the awake interval to the sleep interval can be adjusted.

FIG. 16 (16-1) exemplarily shows that the Wi-Fi performance is preferred to the battery saving if the slide bar 430 is touched & dragged in one direction within the range of the section B.

Referring to FIG. 16 (16-2), in proportion to the length of the touch & drag in one direction, the sleep interval is shortened, whereas the awake interval is further elongated. For example, FIG. 16 (16-2) shows that the ratio of the awake interval to the sleep interval in the power saving mode is set to 80:20.

FIG. 17 (17-1) exemplarily shows that the Wi-Fi performance is adjusted to be preferred to the battery saving if the slide bar 430 located in the section B is touched & dragged in the other direction within the range of the section B.

Referring to FIG. 17 (17-2), in proportion to the length of the touch & drag in the other direction, the awake interval is shortened, whereas the sleep interval is further elongated. For example, FIG. 17 (17-2) shows that the ratio of the awake interval to the sleep interval in the power saving mode is set to 20:80.

Referring to FIG. 18 (18-1), the slide bar 430 is touched & dragged to be located in the second C.

If so, referring to FIG. 18 (18-2), the AP function is set to the forced power saving setting, whereby the Wi-Fi module 113 keeps operating in the power saving mode.

As the slide bar 430 is touched & dragged within a range of the section C, the AP function can operate in a power saving mode. In doing so, the ratio of the awake interval to the sleep interval can be adjusted.

FIG. 18 (18-1) exemplarily shows that the Wi-Fi performance is preferred to the battery saving if the slide bar 430 is touched & dragged in one direction within the range of the section C.

Referring to FIG. 18 (18-2), in proportion to the length of the touch & drag in one direction, the sleep interval is shortened, whereas the awake interval is further elongated. For example, FIG. 18 (18-2) shows that the ratio of the awake interval to the sleep interval in the power saving mode is set to 80:20.

FIG. 19 (19-1) exemplarily shows that the battery performance is adjusted to be preferred to the Wi-Fi performance if the slide bar 430 located in the section C is touched & dragged in the other direction within the range of the section C.

Referring to FIG. 19 (19-2), in proportion to the length of the touch & drag in the other direction, the awake interval is shortened, whereas the sleep interval is further elongated. For example, FIG. 19 (19-2) shows that the ratio of the awake interval to the sleep interval in the power saving mode is set to 20:80.

In the above description, the setting of the AP function is selected by touching & dragging the slide bar 430, by which the present embodiment is non-limited.

Referring to FIG. 20 (20-1), various settings are displayed on the touchscreen 400. And, one of the settings can be selected through an appropriate manipulation of the user input unit 130. For example, FIG. 20 shows that the selection is made by touching a prescribed setting.

FIG. 20 (20-1) exemplarily shows that the forced power saving off setting is selected from the various settings. Since the power saving mode does not exist in the forced power saving off setting, the slide bar 430 is deactivated for example.

Referring to FIG. 20 (20-2), the auto power saving setting is selected from the various settings. Since the power saving mode exists in the auto power saving setting, FIG. 20 (20-2) shows that the slide bar 430 is activated for example.

In the above description, the setting can be selected after the AP function has been activated, by which the present embodiment is non-limited. Alternatively, the setting can be configured to be selected before the AP function is activated.

Moreover, in the above description, one of the settings is manually selected by a terminal user, by which the present embodiment is non-limited. Alternatively, one of the settings can be configured to be automatically selected. For instance, the controller 130 is able to configure the following settings. First of all, the controller monitors data traffic between the external device 200 and the Wi-Fi module 113. If the data traffic is considerable, the forced power saving off setting is selected. If the data traffic is moderate, the auto power saving setting is selected. If the data traffic is small, the forced power saving setting is selected.

Accordingly, the present invention provides the following effects and/or advantages.

First of all, according to at least one of embodiments of the present invention, the cause of the performance degradation, which may be generated when the AP function is activated in the mobile terminal and/or a function of reducing power consumption of the AP function is activated, is prevented, whereby the AP function can operate smoothly.

It will be apparent to those skilled in the art that various modifications and variations can be specified into other forms without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a user input unit configured to input information into the mobile terminal;
a display unit configured to display data;
a Wi-Fi module configured to provide an Access Point (AP) function such that a plurality of external terminals can access a wireless network through the Wi-Fi module providing the AP function; and
a controller configured to control a state of the Wi-Fi module to be switched between 1) a power saving mode in which the Wi-Fi module is alternated between a sleep state and an awake state and 2) a power saving off mode in which the Wi-Fi module is continuously maintained in the awake state,
wherein the state of the Wi-Fi module is switched from the power saving off mode to the power saving mode in response to receipt of beacon ACK messages for AP scanning from a preset number of external devices or an elapse of a predetermined amount of time from a specific timing point whichever occurs first, and
wherein the controller is further configured to control the display unit to display a first user interface configured to adjust a ratio of the awake state and the sleep state for the power saving mode.

2. The mobile terminal of claim 1, wherein when the Wi-Fi module is in the power saving off mode, the controller is further configured to maintain the Wi-Fi module in the power saving off mode until the beacon ACK messages are received from the preset number of external devices or the predetermined amount of time passes from the specific timing point.

3. The mobile terminal of claim 1, wherein when the AP function has been activated, and the Wi-Fi module is entered into the power saving mode, the controller is further configured to enter the Wi-Fi module into the power saving off mode in response to receipt of a user input command via the input unit.

4. The mobile terminal of claim 3, wherein if the beacon ACK message is received, the controller is further configured to enter the Wi-Fi module into the power saving mode even if the predetermined amount of time has not passed, and
wherein if the predetermined amount of time has passed, the controller is further configured to enter the Wi-Fi module into the power saving mode even if the beacon ACK message is not received.

5. The mobile terminal of claim 1, wherein the ratio of the awake state and the sleep state can be increased via the user interface for a selected better wireless network performance and can be decreased via the user interface for a selected better battery power savings.

6. The mobile terminal of claim 1, wherein the controller is further configured to display a second user interface including at least first, second and third selectable categories between a best wireless network performance and a best battery power savings,
wherein the first category closest to the best wireless network performance is a forced power saving off setting in which the controller controls the Wi-Fi module to be operable in the power saving off mode only,
wherein the second category closest to the best better battery power savings is a forced power saving setting in which the controller controls the Wi-Fi module to be operable in the power saving mode only, and
wherein the third category between the best wireless network performance and the best battery power savings is an auto power saving setting in which the controller controls the Wi-Fi module to be switchably operable between the power saving off mode and the power saving mode according to data traffic of the AP module.

7. A method of controlling a mobile terminal, the method comprising:
providing, via a Wi-Fi module on the mobile terminal, an Access Point (AP) function such that a plurality of external terminals can access a wireless network through the Wi-Fi module providing the AP function;
controlling, via a controller on the mobile terminal, a state of the Wi-Fi module to be switched between 1) a power saving mode in which the Wi-Fi module is alternated between a sleep state and an awake state and 2) a power saving off mode in which the Wi-Fi module is continuously maintained in the awake state; and
displaying, on a display of the mobile terminal, a first user interface configured to adjust a ratio of the awake state and the sleep state for the power saving mode,
wherein the state of the Wi-Fi module is switched from the power saving off mode to the power saving mode in response to receipt of beacon ACK messages for AP scanning from a present number of external devices or an elapse of a predetermined amount of time from a specific timing point whichever occurs first.

8. The method of claim 7, wherein when the Wi-Fi module is in the power saving off mode, the method further comprises maintaining the Wi-Fi module in the power saving off mode until the beacon ACK messages are received from the preset number of external devices or the predetermined amount of time passes from the specific timing point.

9. The method of claim 7, wherein when the AP function has been activated, and the Wi-Fi module is entered into the power saving mode, the method further comprises entering the Wi-Fi module into the power saving off mode in response to receipt of a user input command via the input unit.

10. The method of claim 9, wherein if the beacon ACK message is received, the method further comprises entering the Wi-Fi module into the power saving mode even if the predetermined amount of time has not passed, and wherein if the predetermined amount of time has passed, the method further comprises entering the Wi-Fi module into the power saving mode even if the beacon ACK message is not received.

11. The method of claim 7, wherein the ratio of the awake state and the sleep state can be increased for the user interface for a selected better wireless network performance and can be decreased via the user interface for a selected better battery power savings.

12. The method of claim 7, further comprising displaying a second user interface including at least first, second and third selectable categories between a best wireless network performance and a best battery power savings, wherein the first category closest to the best wireless network performance is a forced power saving off setting in which the Wi-Fi module is controlled to be operable in the power saving off mode only, wherein the second category closest to the best better battery power savings is a forced power saving setting in which the Wi-Fi module is controlled to be operable in the power saving mode only, and wherein the third category between the best wireless network performance and the best battery power savings is an auto power saving setting in which the Wi-Fi module is controlled to be switchably operable between the power saving off mode and the power saving mode according to data traffic of the AP module.

* * * * *